US006175774B1

(12) United States Patent
Frank et al.

(10) Patent No.: US 6,175,774 B1
(45) Date of Patent: Jan. 16, 2001

(54) METHOD FOR BURNING IN AND DIAGNOSTICALLY TESTING A COMPUTER

(75) Inventors: Jonathan Frank; Greg P. Johnson, both of Boise, ID (US)

(73) Assignee: Micron Electronics, Inc., Nampa, ID (US)

(*) Notice: Under 35 U.S.C. 154(b), the term of this patent shall be extended for 0 days.

(21) Appl. No.: 09/245,108

(22) Filed: Jan. 13, 1999

Related U.S. Application Data

(60) Continuation of application No. 08/879,555, filed on Jun. 20, 1997, now abandoned, which is a division of application No. 08/773,027, filed on Dec. 23, 1996, now Pat. No. 5,877,956.

(51) Int. Cl.[7] .................................................. G05B 9/02
(52) U.S. Cl. .................................. 700/79; 700/80; 700/81; 700/12; 700/21; 700/86; 714/2; 714/8; 714/9; 714/23; 714/25
(58) Field of Search ........................... 364/141; 374/830, 374/73.1, 760, 765; 700/11, 12, 21, 24, 79–80, 81, 84–86; 716/4, 6; 714/2–3, 8, 9, 23, 10, 14, 25, 30–37

(56) References Cited

U.S. PATENT DOCUMENTS

| | | | |
|---|---|---|---|
| 4,175,286 | 11/1979 | Hunter et al. | 364/437 |
| 4,489,394 | 12/1984 | Borg | 364/900 |
| 4,586,179 | 4/1986 | Sirazi et al. | 371/12 |
| 4,706,208 | 11/1987 | Helms | 364/580 |
| 4,747,041 | * 5/1988 | Engel et al. | 700/191 |
| 4,775,957 | 10/1988 | Yakuwa et al. | 364/900 |
| 4,777,379 | 10/1988 | Young | 307/41 |
| 4,782,486 | * 11/1988 | Lipcon et al. | 714/21 |
| 4,855,922 | 8/1989 | Huddelston et al. | 364/468.06 |
| 4,866,714 | 9/1989 | Adams et al. | 371/22.1 |
| 4,912,708 | 3/1990 | Wendt | 371/163 |
| 5,203,000 | 4/1993 | Folkes et al. | 324/760 |
| 5,239,652 | * 8/1993 | Seibert et al. | 713/300 |
| 5,315,598 | 5/1994 | Tran | 371/21.1 |
| 5,345,583 | 9/1994 | Davis | 395/575 |
| 5,353,240 | 10/1994 | Mallory et al. | 364/552 |
| 5,357,519 | 10/1994 | Martin et al. | 371/15.1 |
| 5,390,129 | 2/1995 | Rhodes | 364/480 |
| 5,398,333 | 3/1995 | Schieve et al. | 395/575 |
| 5,486,726 | * 1/1996 | Kim et al. | 307/120 |
| 5,511,161 | 4/1996 | Sato et al. | 395/183.06 |
| 5,511,204 | 4/1996 | Crump et al. | 395/570 |
| 5,537,537 | 7/1996 | Fujikawa et al. | 395/183.06 |
| 5,543,727 | 8/1996 | Bushard et al. | 324/760 |
| 5,613,115 | 3/1997 | Gihl et al. | 395/701 |
| 5,689,715 | 11/1997 | Crump et al. | 395/750 |
| 5,710,930 | 1/1998 | Laney et al. | 395/750 |

* cited by examiner

*Primary Examiner*—Paul P. Gordon
*Assistant Examiner*—Ramesh Patel
(74) *Attorney, Agent, or Firm*—Knobbe, Martens, Olson & Bear, LLP

(57) ABSTRACT

An apparatus and method for burning in a computer having a parallel port, includes a diagnostic program, stored in an internal memory of the computer, for running diagnostic tests on at least one component of the computer. The apparatus also includes a power cycling circuit, coupled to the parallel port of the computer, for receiving a power-off signal from the computer, for turning power off to the computer in response to the power-off signal and for automatically turning power back on to the computer after a specified period of time has elapsed.

10 Claims, 3 Drawing Sheets

METHOD FOR BURNING IN AND DIAGNOSTICALLY TESTING A COMPUTER

RELATED APPLICATIONS

This application is a continuation of U.S. patent application Ser. No. 08/879,555, filed Jun. 20, 1997, now abandoned, which is a divisional of U.S. patent application Ser. No. 08/773,027, filed Dec. 23, 1996 now U.S. Pat. No. 5,877,956.

BACKGROUND OF THE INVENTION

1. Field of the Invention

The present invention relates in general to burn-in processes for computers. More particularly, the present invention relates to a burn-in process for computers whereby power is cycled to the computer.

2. Description of Related Technology

The term "burn-in" is a common and well-known term in the electronics industry which refers to a testing method performed on electrical and electronic components, subassemblies and complete systems thereof. The burn-in process detects early failures, and allows manufacturers to replace or repair units which have failed under constant exposure to predetermined environmental or operational stresses, thereby ensuring the reliability of the circuits and systems once they have been placed in use with the customers.

The process of power cycling electronic components and circuits during the burn-in phase is well-known in the industry. However, in the computer manufacturing industry, there has been no method or apparatus which power cycles the entire computer during the burn-in phase while diagnostically testing various components, systems and/or interfaces within the computer between successive power-off cycles. Such power cycling can detect many types of early failures associated with the power-up and power-down of the computers. Such failures include, but are not limited to, for example, the failure of the basic input/output system (BIOS) to reset during the power-up phase of the computer, which can result in, for example, no video signal being sent to the video monitor by the computer. Other failures include the hard drive not booting upon power-up of the computer, the floppy drive not booting upon power-up of the computer, and an incorrect memory quantity reporting after a power-on self-test (POST) of the computer. All of these failures relate to the BIOS resetting to default values or the BIOS code being corrupted.

The BIOS code is a program stored in either a flash ROM or EEPROM of a computer motherboard or its peripherals, such as video adapters, hard drives, zip drives, cd-roms, etc. BIOS is a program which configures the computer system or peripherals to accept specified inputs and outputs from and to other integrated devices (peripheral devices). Upon initial power-up of the computer, it is the BIOS which provides system parameters, e.g., configuration parameters of the hard disk, etc., and allows the computer to "boot-up" a particular operating system, such as Windows 95®. Occasionally, the BIOS code is corrupted upon power-up of the computer such that the system parameter settings reset to default values which are incorrect for a particular computer configuration. When this occurs, the computer will not operate properly because the subsystems of the computer are unable to communicate properly with each other and to peripheral devices connected to the computer. This defect may be discovered during power cycling of the computer. Other defects which may be detected by power cycling the computer are a defective power supply and defective connections between the various circuits and components of the computer. By rapidly heating and cooling the components within a computer, power cycling can detect faulty circuit and/or components which do not perform within specified tolerances as a result of this rapid heating and cooling. Typically, such faulty circuits or components cause current fluctuations which can damage the computer or detrimentally effects its performance.

In the prior art, there are apparatuses and methods for automatically testing and power cycling computers. However, these prior art systems and methods do not operate in conjunction with a diagnostic program embedded within the computer to fully test various components, systems and/or interfaces within the computer while power cycling the computer in a simple, less expensive and elegant manner. For example, Mallory et al., U.S. Pat. No. 5,353,240, which is incorporated herein by reference, discloses a test apparatus and method for automatically testing computing equipment.

The test apparatus disclosed by Mallory et al., comprises a switch for switching power to a computer and also includes a complicated testing circuit coupled to the switch for testing whether the computer has turned on successfully. However this test apparatus does not operate in conjunction with a diagnostics software program as would be required to test various components, subsystems and/or interfaces within the computer. Instead, the test apparatus of Mallory et al., has a microprocessor based testing circuit which receives signals from the computer via the keyboard port of the computer.

The microprocessor of the test circuit disclosed by Mallory et al. has a memory for storing a time signal received from the computer. In addition, the testing circuit has the ability to receive a condition signal from the computer which indicates whether the computer has successfully restarted following the passage of a period of time. This condition signal also indicates whether testing on the computer is currently in progress, whether the computer needs attention, or whether the computer has successfully rebooted, failed or timed out.

Prior art test apparatus, such as that described above, do not provide thorough diagnostic testing of the various systems and components of a computer during rigorous power cycling of the computer. For example, Mallory et al., does not disclose any type of software diagnostics program, embedded within the computer, which cooperates with the power-cycling apparatus in order to test and power cycle the computer. Rather, Mallory et. al., discloses a complex microprocessor based testing apparatus and power cycling circuit which can only test whether the computer has successfully restarted.

Systems such as that disclosed by Mallory et al. have not met the needs of the rapidly growing computer manufacturing industry which include the need to test for conditions such as improper resetting of the computer's BIOS code, or corruption of the BIOS code, or faulty circuits on the motherboard which can only be detected by a diagnostics program operating in conjunction with the power cycling of the computer.

Because it would be extremely tedious, and would consume human resources, to manually turn a computer on and off while running various diagnostic tests via a software program embedded in the computer during power cycling, a method and apparatus are needed which can automatically power cycle the computer and successively run diagnostics tests on the computer in order to detect various defects within the computer at an early stage after the manufacturing process.

SUMMARY OF THE INVENTION

The present invention addresses the above and other needs by providing a burn-in system which includes a power cycling circuit that can be connected to the parallel port of a computer during the burn-in phase of the computer manufacturing process and a diagnostic program stored within the computer to run diagnostic tests on various components, subsystems, and/or interfaces within the computer during successive power-on cycles. This power cycling circuit acts as a power switch for the computer during the burn-in phase. As used herein, the term "computer" refers to any microprocessor-based system capable of processing information and receiving and sending information or data from and to peripheral devices attached to the system.

In one embodiment of the invention, a trigger program is written into the diagnostic software program as a subprogram, or subroutine, of the diagnostic program. This trigger program sends a trigger signal to the computer's parallel port which triggers the power cycling circuit. Upon activation of the power cycling circuit by the triggering signal, power to the computer is turned off for a specified period of time, typically five minutes, after which the power cycling circuit automatically powers the computer back up. This process can be repeated for as many cycles as is desired.

In another embodiment, a burn-in system for a computer in accordance with the present invention, includes: a diagnostic program, stored in an internal memory of the computer, for running diagnostic tests on at least one component of the computer; a power cycling circuit, coupled to the computer, for receiving a trigger signal from the computer, for turning power off to the computer in response to the trigger signal, and for automatically turning power back on to the computer after a specified period of time has elapsed; and a trigger program, stored in the internal memory of the computer, for sending a trigger signal to the power cycling circuit in order to activate the power cycling circuit to disconnect power to the computer. As used herein, "component" refers to any system, subsystem, device, circuit, program, element or part of the software, firmware or hardware of the computer.

In another embodiment, a power cycling circuit, in accordance with the present invention, includes a connector for connecting the power cycling circuit to the parallel port of the computer; a triggering circuit, coupled to the connector, for receiving a trigger signal from the parallel port of the computer; a switch, coupled to the triggering circuit, for connecting and disconnecting power to a power supply of the computer, thereby turning power on and off, respectively to the computer; and a timing circuit, coupled to the triggering circuit, for monitoring a specified duration of time between successive power-on and power-off cycles wherein the timing circuit is further coupled to the switch for opening the switch in response to the trigger signal and automatically closing the switch upon expiration of said specified duration of time.

The present invention may also be characterized as a method of burning-in a computer, the method comprising the steps of: (a) running an internal diagnostic program on the computer, to test at least one component of the computer; (b) automatically shutting off power to the computer for a specified duration of time; (c) automatically turning on power to the computer upon expiration of the specified duration of time; and (d) automatically repeating steps (a)–(c) above a specified number of times.

In another embodiment, the present invention may be characterized as a method of burning-in a computer having a power cycling circuit connected thereto, the power cycling circuit including a timer circuit for monitoring the cycle interval of the power cycling circuit, the method comprising the steps of: (a) running an internal diagnostic program on the computer to test at least one component of the computer; (b) sending a trigger signal from the computer to the power cycling circuit; (c) shutting off power to the computer in response to the trigger signal; (d) starting the running of the timer circuit; (e) turning on power to the computer after the timer circuit has run for a specified duration of time; and (f) automatically repeating steps (a)–(e) above a specified number of times.

Upon activation by the triggering signal, the power cycling circuit starts the running of an internal timer which runs for a specified period of time, after which the power cycling circuit once again supplies power to the computer. This timing circuit is independent of the particular software program embedded in the computer.

Therefore, the burn-in system for computers of the present invention provides an efficient and automated system for power cycling computers, while running specified diagnostics tests on the computers during successive power on cycles, in order to detect defects associated with the power-on and power-off of the computers, at an early stage.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE PREFERRED EMBODIMENT

The following description presents the best mode presently contemplated for carrying out the invention. This description is not to be taken in a limiting sense, but is made merely for the purpose of describing the general principles of the invention. The scope of the invention should be determined with reference to the claims.

Figure 1:
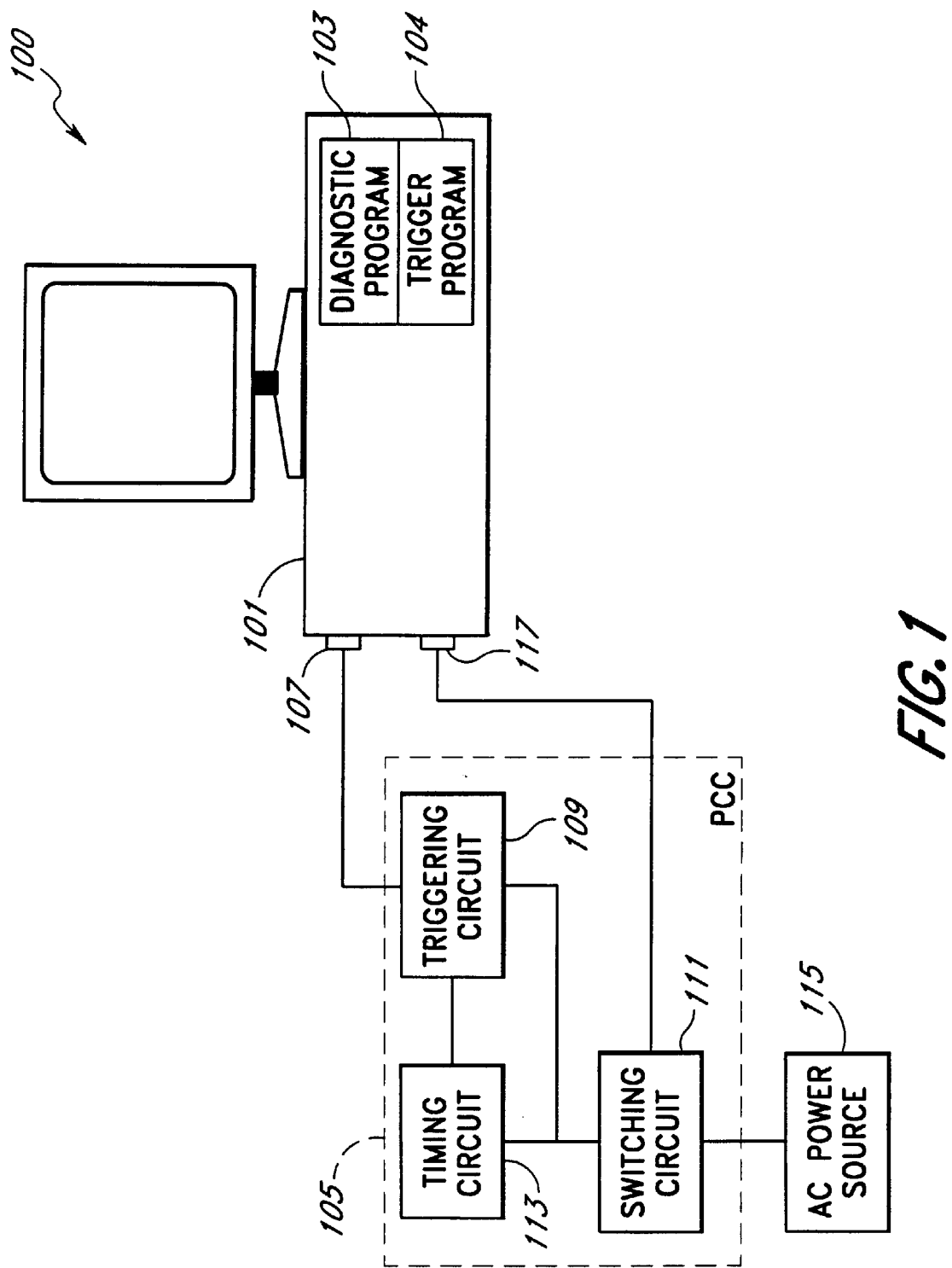
FIG. 1 is a block diagram of a power cycling system in accordance with the present invention.

FIG. 1 is a block diagram of a burn-in system 100 for a computer in accordance with the present invention. The burn-in system 100 includes a computer 101 to be tested, a diagnostic software program 103 stored in an internal memory of the computer and a trigger program 104 also stored in the internal memory of the PC. In one preferred embodiment, the diagnostic program is a program called QAFACTORY®, manufactured by Diagsoft, Inc., which can test, for example, the internal memory, the hard disk drive, the floppy disk drive, the motherboard, etc. of the computer 101.

The computer 101 further includes a parallel port 107 to which a power cycling circuit 105 is connected. The power cycling circuit 105 cycles power to the computer 101, thereby turning the computer 101 on and off a desired number of times. The power cycling circuit 105 includes a triggering circuit 109 for receiving a trigger signal from the parallel port 107 of the computer 101. Although, in the embodiment described above, the power cycling circuit 109 receives the trigger signal via the parallel port 107 of the computer 101, it should be appreciated that the trigger signal may be transmitted by other ports such as a DB-9 serial port, DB-25 serial port, a keyboard port, PS/2 port, Universal Serial Bus (USB) port, etc.

Upon receiving the trigger signal, triggering circuit 109 activates a switching circuit 111 coupled to the triggering circuit 109 and to the computer's power outlet 117, to disconnect power to the computer 101. The trigger circuit 109 and the switching circuit 111 will be described in greater detail with reference to FIG. 3 below. The power cycling circuit 105 also includes a timing circuit 113, coupled to the triggering circuit 109, which monitors the elapsed time between power-on and power-off cycles. The timing circuit 113 begins running when the triggering circuit 109 receives a trigger signal from the parallel port 107 of the computer 101. The timing circuit 113 will be described in greater detail with reference to FIG. 3 below. After a predetermined period of time has run, the timing circuit 113 automatically activates the switching circuit 111 to connect the computer 101 to an A.C. power source 115. In the preferred embodiment, the timing circuit 113 is an integrated circuit (IC) chip manufactured by NuTone Electronics, Inc. (NTE), part no. 955M. The power cycling circuit 105 operates in conjunction with the diagnostic program 103 to cycle power to the computer 101 while diagnostic tests are performed on the computer 101.

In the preferred embodiment, the trigger program 104 is a program created by Micron Electronics, Inc., which is written into the diagnostic software program, QAFACTORY, and which is therefore embedded into QAFACTORY as a subprogram, or subroutine. The operation of the trigger program 104 will be described in greater detail with reference to FIG. 2 below.

As mentioned above, the execution of the QAFACTORY program can test, for example, the configuration and parameter settings of the computer, the hard disk drive, the floppy disk drive, and the video monitor, as well as the motherboard of the computer. Additionally, QAFACTORY may test the small computer system interface (SCSI) hard disk drive configuration parameters and the CD-ROM configuration parameters. After the QAFACTORY program has completed one or more of its tests, the QAFACTORY program will call and run the trigger program 104 which is embedded within the QAFACTORY program. This trigger program 104 sends a triggering signal to the parallel port 107 of the computer 101 thereby activating triggering circuit 109 which in turn opens switching circuit 111 to disconnect power to the computer 101. The timing circuit 113 of the power cycling circuit 105 also begins running when the triggering circuit 109 receives the trigger signal from the parallel port 107 of the computer 101.

The source code for the trigger program 104 which sends the trigger signal to the parallel port 107 of the computer 101 is as follows:

PAGE 58, 132
TITLE Trigger
0.286

```
;------------------------STACK segment
SSEG SEGMENT STACK
    DB    32DUP(OFFH)
SSEG ENDS
;------------------------DATA segment
```

-continued

```
DSEG SEGMENT
MESSAGE           DB    10000000B
DSEG ENDS
;------------------------CODE segment
CSEG SEGMENT 'CODE'
ASSUME            CS:CSEG,SS:SSEG,DS:DSEG
  PAGE
;------------------------
; MAIN (main program)
;
;   Purpose:
;     to force pins high on a computer parallel port
;
;   Input:
;     --none--
;
;   Output:
;     the power cycling circuit cuts power to the computer.
;
;   Procedures:
;     --none--
;------------------------
;   Procedure: MAIN
MAIN PROC FAR
;   Save address to return to DOS
        PUSH DS
        PUSH 0
;   set up segment register
        MOV AX,11111111B
        MOV DX,378H
;
        OUT DX,AX
;   return to DOS
        RET
;   End of Procedure: MAIN
    MAIN ENDP
;   End of Code Segment
    CSEG ENDS
;-----End of Program
END MAIN
```

Figure 2:
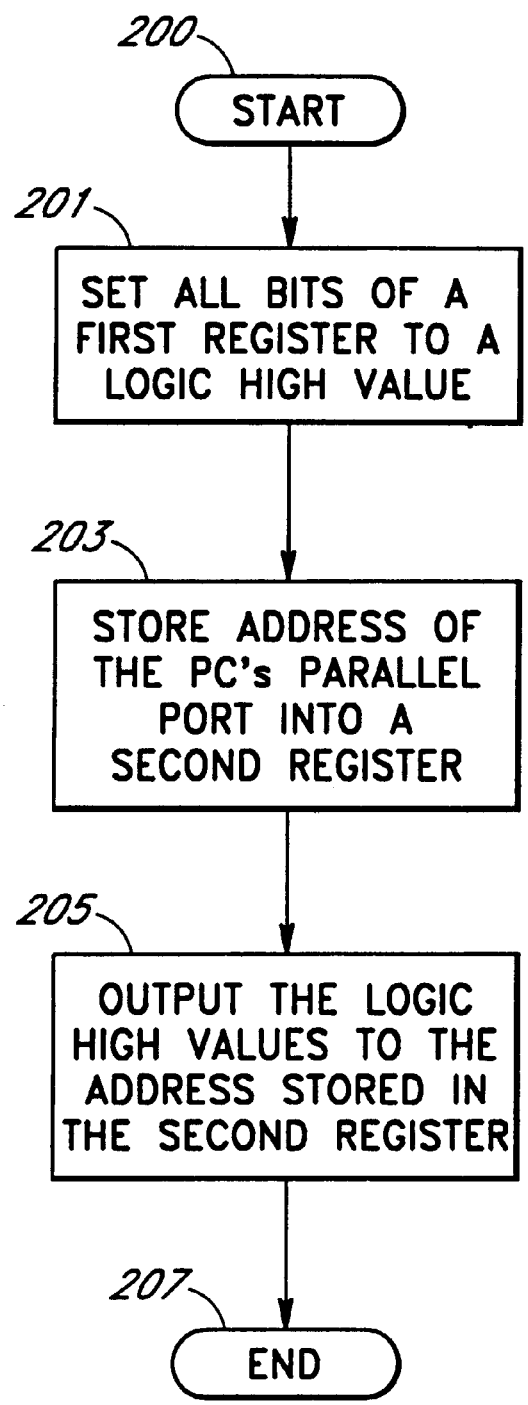
FIG. 2 is a flow chart of a triggering program in accordance with the present invention.

As shown above, this source code is written in Assembly language which is compiled by a Microsoft Assembler, commonly known in the industry as MASM, which converts the Assembly language code into executable object code capable of being executed by the computer 101. In the source code shown above, anything written on a line after a ";" is ignored. The rest of the code comprises commands written in Assembly language which are compiled and then executed by the computer. Referring to FIG. 2, the trigger program is initiated in a state 200 from where the computer moves to state 201 and sets all the bits of a register to a logic high value. This is accomplished by the command MOVE AX, 11111111B, where AX is the address of a particular register and the 11111111B represents a logic level high for each bit in that register and the letter "B" signifies that the byte is binary. The computer then moves to state 203 wherein it stores the address of the parallel port (378H) into register DX by the command MOV DX 378H. The computer then moves to state 205 and outputs the logic level high values to the address stored in register DX, which is the address of the parallel port (378H). This is accomplished in response to the command OUT DX, AX. The computer then moves to state 207 wherein the trigger program is terminated. In this way, the software program sends a trigger signal to the parallel port 107 of the computer 101, thereby activating the triggering circuit 109 of the power cycling circuit 105 which is coupled to the computer 101 via the parallel port 107.

Figure 3:
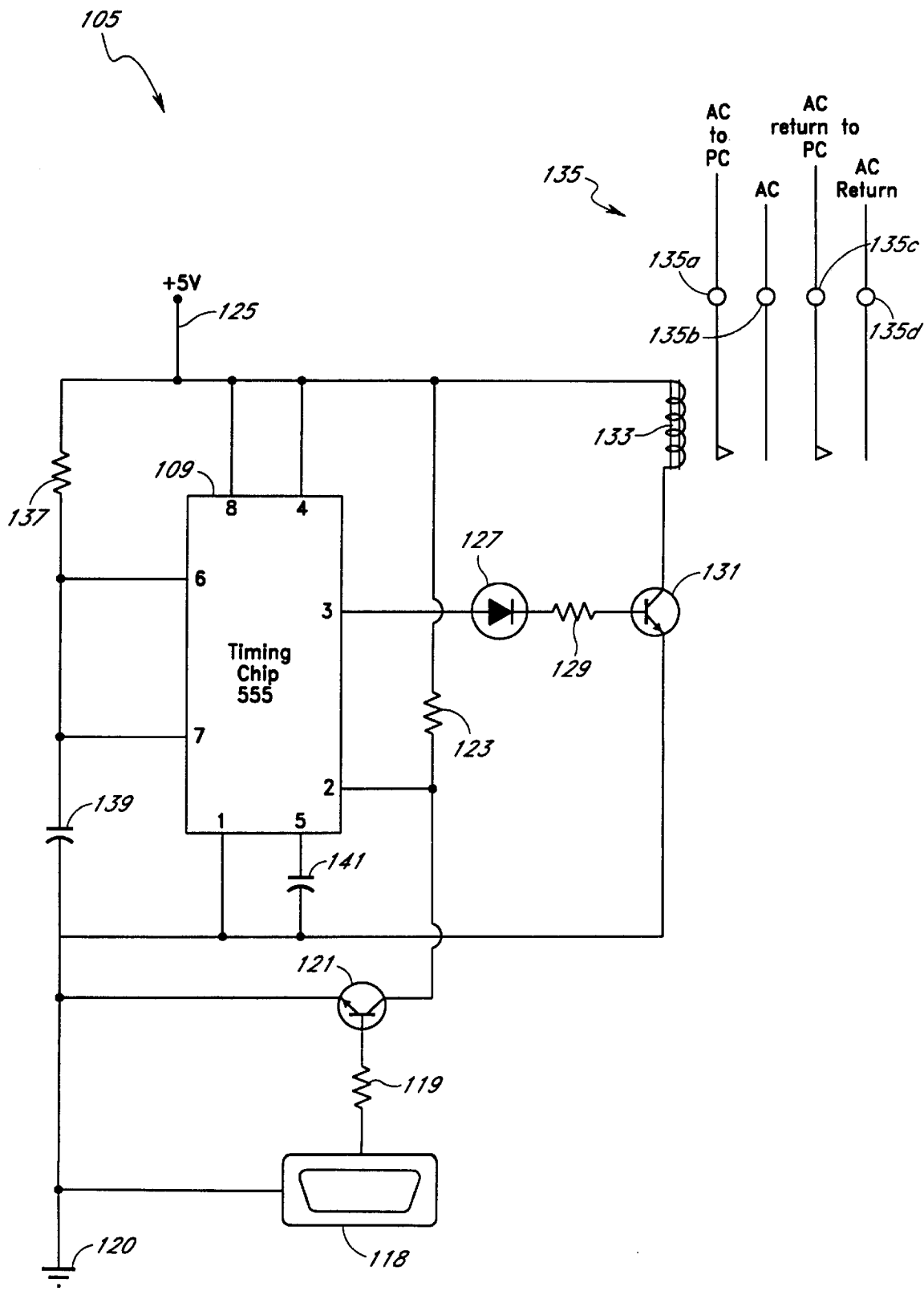
FIG. 3 is a schematic diagram of a preferred embodiment of the power cycling circuit in accordance with the present invention.

Referring to FIG. 3, it is seen that the power cycling circuit 105 of the present invention includes a connector 118 for connecting the power cycling circuit 105 to the parallel port 107 of the computer 101. The connector 118 may be one of the numerous, well-known and commercially available connectors which are compatible with the parallel port of a computer. The connector 118 has at least one terminal connected to ground 120 and at least one other terminal connected to one end of a first resistor 119. The other end of the first resistor 119 is connected to the base of a first bipolar transistor 121. The emitter of the transistor 121 is connected to ground 120, and the collector of the first transistor 121 is connected to one end of a second resistor 123. The other end of the second resistor 123 is connected to a voltage supply (+5V) 125. The discrete components of the power cycling circuit 105, e.g., resistor 119, transistor 121 etc., are standard components which are well-known in the art and commercially available.

The power cycling circuit 105 also includes a timer chip 109 which in the preferred embodiment is a NuTone Electronics, Inc. (NTE) 955M integrated circuit. The timer chip 109 has a first pin connected to ground 120. A second pin of the timer chip 109 is connected to the collector of the first transistor 121 and the first end of the second resistor 123. Pin 3 of the timer chip 109 is connected to the positive junction of a diode 127. The negative junction of the diode 127 is connected to a first end of a third resistor 129. The second end of the third resistor 129 is connected to the base of a second bipolar transistor 131 having a collector connected to a first end of a magnetic inductance coil 133 and a emitter connected to ground 120. The second end of the magnetic inductance coil 133 is connected to the voltage supply 125. Magnetically coupled to the magnetic inductance coil 133 is a relay switch 135 which includes switch contacts 135a–135d. As shown in FIG. 3, switch contact 135a includes a terminal connected to the AC power outlet of the computer (not shown). Similarly, switch contacts 135b, 135c and 135d include terminals which are connected to the external AC power source (not shown), the AC return of the computer, and the AC return of the external AC power source, respectively. During the power-on stage, switch contact 135a is in contact with switch contact 135b and switch contact 135c is in contact with switch contact 135d, thereby supplying AC power from an external power source, i.e., 115 volt AC wall outlet (not shown), to the computer 101 (See FIG. 1). During the power-offstage, switch contacts 135a and 135c are deflected by means of magnetic inductance such that they are not touching switch contacts 135b and 135d, respectively. Therefore in this state, there is no closed loop between the external AC power source and the computer.

Pins 4 and 8 of the timer chip 109 are connected to the positive voltage supply 125. A fourth resistor 137 has one end also connected to the positive voltage supply 125 and a second end connected to pins 6 and 7 of the timer chip 109. Also connected to pins 6 and 7 of the timer chip 109 is the first end of a first capacitor 139 having a second end connected to ground 120. Pin 5 of the timer chip 109 is connected to a first end of a second capacitor 141 which has a second end connected to ground 120.

In operation, the trigger program 104 sends a trigger signal, typically a high voltage pulse of specified duration, to the connector 118. The connector 118 is connected to the parallel port 107 of the computer 101 and transfers the high voltage pulse through the first resistor 119 to the base of the first transistor 121, thereby turning on the first transistor 121 such that current conducts through the collector and emitter of the transistor 121. As current conducts through the first transistor 121, the voltage at pin 2 goes low because it is essentially connected to ground due to the conduction of the first transistor 121. When the voltage at pin 2 goes low, this causes pin 3 to output a high voltage. This high voltage passes through diode 127 to the base of the second transistor 131, thereby causing the second transistor 131 to conduct. When the second transistor 131 conducts, this provides a path to ground for the magnetic inductance coil 133, thus causing current to flow through the magnetic inductance coil 133. As current passes through the magnetic inductance coil 133, this activates relay switch 135 by causing the relay switch contacts 135a–d to be opened due to the forces of magnetic induction upon the switch contacts 135a–d. When the switch contacts 135a–d of relay switch 135 are opened, power to the computer is disconnected.

At the same time that pin 3 of the timing chip 109 outputs a high voltage, pin 7 of the timing chip 109 provides a discharge path for the first capacitor 139, which has a charge of +5 volts DC. When the first capacitor 139 has discharged to a sufficiently low voltage, the timing chip 109 is triggered by this low voltage on pin 6. The time it takes the first capacitor 139 to discharge is determined by the RC characteristics of the first capacitor 139 and the resistive constant characteristic of the timing chip 109. This discharge time determines the power-off period of the power cycling circuit and can be adjusted by changing the value of the first capacitor 139. When the timing chip 109 is triggered by the low on pin 6, the discharge path for the first capacitor 139 is removed. This allows the first capacitor 139 to recharge to +5 volts DC, and pin 3 to return to a low state. The low on pin 3 of the timing chip 109 causes the second transistor 131 to stop conducting, thus de-energizing the magnetic inductance coil 133. When current ceases to flow through inductance coil 133, the magnetic switch contacts 135a–d of relay switch 135 are once again free to close the connection between the external AC power source and the computer 101, thereby providing power to the computer 101 once again. This cycle can be repeated as many times as desired.

The invention described above is a burn-in system which overcomes a long standing need in the art by providing an efficient, inexpensive, and automated system for power cycling computers, while running specified diagnostics tests on the computers during successive power on cycles, in order to detect defects associated with the power on and power off of the computers, at an early stage.

While the invention herein disclosed has been described by means of specific embodiments and applications thereof, numerous modifications and variations could be made thereto by those skilled in the art without departing from the scope of the invention set forth in the claims.

What is claimed is:

1. A method of burning in a computer comprising:
   executing a diagnostic program on the computer to test at least one component;
   automatically, and independent of user intervention, shutting off power to the computer in response to said program for a specified duration of time;
   automatically, and independent of user intervention, turning on power to the computer upon expiration of the specified duration of time; and
   automatically repeating the steps of the method until a limit is reached.

2. The method of claim 1 wherein said diagnostic program is stored in a memory of the computer.

3. The method of claim 1, wherein the acts of shutting off power to the computer for a specified duration of time and turning on power to the computer upon expiration of the specified duration of time are performed by a power cycling circuit coupled to the computer.

4. The method of claim 3, further comprising:

receiving a trigger signal from the computer, wherein said power cycling circuit turns off power to the computer in response to the trigger signal and turns power back on to the computer after said specified duration of time has elapsed.

5. The method of claim 4, wherein said trigger signal is sent by a trigger program which is executed as a subroutine of said diagnostic program.

6. The method of claim 4, further comprising:

activating a timing circuit, in response to said trigger signal, for measuring said specified duration of time, wherein, upon expiration of said specified duration of time, the timing circuit activates said power cycling circuit so as to connect power to the computer.

7. The method of claim 1 wherein the acts of automatically shutting off power to the computer and turning on power to the computer are accomplished by a power cycling circuit coupled to the computer.

8. A method of burning in a computer having a power cycling circuit connected thereto, the power cycling circuit including a timer circuit for measuring a period of time in which power to the computer is disconnected, the method comprising:

running a diagnostic program on the computer to test at least one component in conjunction with power cycling of the computer during a burn-in process, wherein power cycling of the computer comprises:

automatically, and independent of user intervention, sending a trigger signal from the computer to the power cycling circuit;

automatically shutting off power to the computer in response to the trigger signal;

automatically starting operation of the timer circuit in response to the trigger signal;

automatically, and independent of user intervention, turning on power to the computer after the timer circuit has operated for a specified duration of time; and automatically repeating the steps of the method until a selected limit is reached.

9. The method of claim 8 wherein said power cycling circuit is connected to a parallel port of the computer and wherein the step of sending a trigger signal from the computer to the power cycling circuit comprises sending the trigger signal to the power cycling circuit via the parallel port of the computer.

10. A method of burning in a computer, comprising:

automatically, and independent of user intervention, generating a trigger signal;

automatically power-cycling the computer such that power to the computer is turned off in response to the trigger signal and power to the computer is turned back on after a specified period of time has elapsed;

periodically, diagnostically testing the computer in conjunction with power-cycling the computer; and automatically repeating the steps of the method until a limit is reached.

* * * * *